United States Patent Office 3,478,047
Patented Nov. 11, 1969

---

3,478,047
PROCESS FOR MAKING dl-2,3,5,6-TETRAHYDRO-6-PHENYLIMIDAZO[2,1-b]THIAZOLE
Peter Doyle and Alastair Graham Wylie, Macclesfield, England, assignors to Imperial Chemical Industries Limited, Millbank, London, England, a corporation of Great Britain
No Drawing. Filed Nov. 10, 1966, Ser. No. 593,313
Claims priority, application Great Britain, Dec. 10, 1965, 52,526/65
Int. Cl. C07d 91/42; A01n 9/22
U.S. Cl. 260—306.7
1 Claim

ABSTRACT OF THE DISCLOSURE

Process for the manufacture of dl-2,3,5,6-tetrahydro-6-phenylimidazo[2,1-b]thiazole, which comprises reacting 2-imino-3-(2-hydroxy-2-phenylethyl)thiazolidinium p-toluenesulphonate or the appropriate related p-toluenesulfonate with sulphuric acid.

---

This invention relates to a chemical cyclisation process for the manufacture of compounds having anthelmintic properties.

It has been proposed in United Kingdom Patent No. 1,043,489 to manufacture anthelmintic imidazo[2,1-b]thiazole derivatives of the formula:

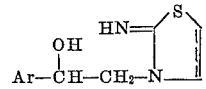

wherein the dotted line between the 2- and 3-positions represents an optional bond, and Ar stands for a thienyl, furyl, naphthyl or benzyl radical, or a phenyl radical optionally substituted with one or more halogen atoms or nitro, amino or trifluoromethyl radicals, provided that, when Ar stands for a benzyl radical, a saturated bond exists between the said 2- and 3-positions, and the therapeutically-acceptable acid-addition salts thereof, by inter alia ring-closing a compound of the formula:

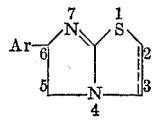

wherein Ar has the meaning stated above, and R and R', which may be the same or different, stand for hydrogen or an acyl radical, provided that when R' stands for an acyl radical then R also stands for an acyl radical, or a salt thereof. However, the only starting material described which is a salt is a hydrobromide.

We have now made the surprising discovery that if particular salts, which are not described in the said patent application, are used as starting material, the product is easier to isolate and it is obtained in higher yield than it is by any of the specific processes described in the above-mentioned application.

According to the invention we provide a process for the manufacture of imidazo[2,1-b]thiazole derivatives of the formula:

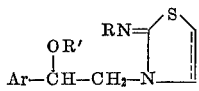

wherein the dotted line between the 2- and 3-positions represents an optional bond, and Ar has the meaning stated above, and the pharmaceutically-acceptable acid-addition salts thereof, which comprises ring-closing an acid-addition salt of a base of the formula:

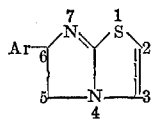

wherein Ar has the meaning stated above and the dotted line represents an optional bond, and an aromatic sulphonic acid.

As specific products of the process of this invention there may be mentioned, for example, dl-2,3,5,6-tetrahydro-6-phenylimidazo[2,1-b]thiazole and pharmaceutically-acceptable acid-addition salts thereof.

As suitable pharmaceutically-acceptable acid-addition salts which may be obtained as products of this invention there may be mentioned salts derived from inorganic or organic acids affording pharmaceutically-acceptable anions, for example hydrochloric or tartaric acid.

As a suitable aromatic sulphonic acid there may be mentioned, for example, an arenesulphonic acid, optionally substituted, for example benzenesulphonic acid or naphthalenesulphonic acid, either of which may optionally be substituted with an alkyl radical of not more than 2 carbon atoms, for example p-toluenesulphonic acid. A preferred starting material is 2-imino-3-(2-hydroxy-2-phenylethyl)-thiazolidinium p-toluenesulphonate.

The ring-closure may be effected by the interaction of the acid-addition salt with a cyclising agent which removes the elements of water therefrom (the hydroxy radical and the hydrogen atom of the imino radical), for example sulphuric acid or polyphosphoric acid. Alternatively, the ring-closure may be effected by the interaction of the acid-addition salt with a phosphorus halide, for example phosphorus trichloride, phosphorus tribromide or phosphorus pentachloride, or a phosphorus oxyhalide, for example phosphorus oxychloride, or thionyl chloride, so as to give the corresponding halogeno compound of the formula:

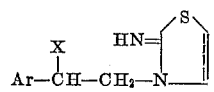

wherein Ar has the meaning stated above and X stands for a halogen atom, for example a chlorine or bromine atom, and the dotted line stands for an optional bond, whereafter the halogeno compound, which may or may not be isolated, is reacted with a base. The interaction which gives the halogeno compound may be carried out in a non-hydroxylic solvent, for example ethylene dichloride. As a suitable base for interaction with the halogeno compound there may be mentioned, for example, a strong inorganic base, for example an alkali metal hydroxide or carbonate, for example sodium hydroxide or potassium carbonate, or an alkaline earth metal hydroxide or ammonium hydroxide. The interaction involving the base and the halogeno compound may be carried out in a diluent or solvent, for example water or one or more organic solvents, or a mixture thereof.

The acid-addition salts which are used as starting materials in the process of the invention may be obtained by the interaction of an epoxide of the formula:

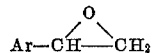

wherein Ar has the meaning stated above, with a compound of the formula:

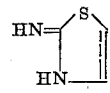

wherein the dotted line represents an optional bond, in the presence of an alkanol of not more than 10 carbon atoms, for example isopropanol, followed by the interaction of the product with an aromatic sulphonic acid. Alternatively, the acid-addition salts may be obtained, as described in Great Britain Patent No. 1,109,148, by the interaction of thiourea or thiocyanic acid with an ammonium salt of the formula:

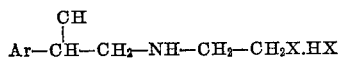

wherein Ar has the meaning stated above and X stands for a halogen atom or a radical of the formula —O.SO$_2$.R, wherein R stands for an aryl radical optionally substituted, whereafter, if desired, the product is reacted with an aromatic sulphonic acid.

The invention is illustrated but not limited by the following examples in which the parts are by weight:

Example 1

1 part of 2-imino-3-(2-hydroxy-2-phenylethyl)-thiazolidinium p-toluenesulphonate is added in portions over 15 minutes to 7.8 parts of stirred concentrated sulphuric acid (density 1.85) which is kept at —5° C. to 0° C. The mixture is stirred for 1 hour at 0° C. and is then poured onto 30 parts of ice. The resulting mixture is stirred and cooled to a temperature not exceeding 10° C., and 9 parts of concentrated ammonium hydroxide (density 0.88) are added, the temperature not being allowed to rise above 10° C. The mixture is filtered, and the solid residue is washed with water and then dried. There is thus obtained dl-2,3,5,6-tetrahydro - 6 - phenylimidazo[2,1-b]thiazole, M.P. 90–92° C., λ max (in "Nujol"—the word "Nujol" is a trademark) 1580 and 1530 cm.$^{-1}$.

The 2-imino-3-(2-hydroxy-2-phenylethyl)-thiazolidinium p-toluenesulphonate which is used as starting material may be obtained as follows:

A solution of 2.04 parts of 2-amino-2-thiazoline(2-iminothiazolidine) and 2.4 parts of 1,2-epoxyphenylethane in 8 parts of isopropanol is stirred at ambient temperature for 48 hours. 1.8 parts of p-toluenesulphonic acid are then added to the reaction mixture. The mixture is cooled and then filtered, and the solid residue is washed with 10 parts of isopropanol and dried at 60° C. There is thus obtained 2-imino - 3 - (2 - hydroxy-2-phenylethyl)-thiazolidinium p-toluenesulphonate, M.P. 232–234° C. (sinters at 210° C.), λ max (in "Nujol"—the word "Nujol" is a trademark) 3380, 3080, 1685, 1650, 1200, 1125, 1040 cm.$^{-1}$.

Example 2

A mixture of 78.8 parts of 2-imino-3-(2-hydroxy-2-phenylethyl)thiazolidinium p-toluenesulphonate and 250 parts of ethylene dichloride is stirred at ambient temperature. 36.1 parts of phosphorus tribromide are added to the mixture over 30 minutes, the mixture being kept at 20 to 25° C. during this addition. When the addition is completed, the mixture is cooled to 20° C. and then stirred for 6 hours. The mixture is then added during 30 minutes to a stirred mixture of 96 parts of 48% w./w. aqueous sodium hydroxide solution, 200 parts of ice, and 200 parts of water, and the resulting mixture is stirred for 1 hour. The organic layer is separated from the aqueous layer (both layers being retained). The organic layer is added to a mixture of 26 parts of hydrochloric acid (density 1.18) and 200 parts of water, and the resulting mixture is agitated for 30 minutes. The hydrochloric acid layer is separated from the organic layer, the latter being discarded. The abovementioned aqueous layer is agitated together with 125 parts of ethylene dichloride for 30 minutes, and the ethylene dichloride layer is separated and added to the abovementioned hydrochloric acid layer. The resulting mixture is agitated for 15 minutes, and the organic layer is then discarded. 150 parts of ice are added to the acidic aqueous solution, and the mixture is agitated and adjusted to pH 9 by the slow addition of 20 parts of concentrated ammonium hydroxide solution (density 0.88). The resulting mixture is stirred for 1 hour and then filtered. The solid residue is washed with water and then dried at 40–45° C. There is thus obtained dl-2,3,5,6-tetrahydro-6-phenylimidazo[2,1-b]thiazole, M.P. 90–92° C.

What we claim is:

1. Process for the manufacture of dl-2,3,5,6-tetrahydro-6-phenylimidazo[2,1-b]thiazole and related compounds, which comprises reacting 2-imino-3-(2-hydroxy-2-phenylethyl) thiazolidinium p-toluenesulphonate or the appropriate related to p-toluenesulfonate or the appropriate related p-toluenesulphonate with sulphuric acid 5° C. to 0° C.

References Cited

UNITED STATES PATENTS 3,274,209   9/1966   Raeymaekers et al. __ 260—306.7

ALEX MAZEL, Primary Examiner

R. J. GALLAGHER, Assistant Examiner

U.S. Cl. X.R.

260—306.8, 999

PO-1050
(5/69)

UNITED STATES PATENT OFFICE
CERTIFICATE OF CORRECTION

Patent No. 3,478,047      Dated November 11, 1969

Inventor(s) Peter Doyle et al

It is certified that error appears in the above-identified patent and that said Letters Patent are hereby corrected as shown below:

IN THE "ABSTRACT OF THE DISCLOSURE"

Line 2, before the comma, insert

--and related compounds--.

IN THE CLAIM

Line 2, delete "and related compounds"

Lines 4-6, delete "or the appropriate related to p-toluenesulfonate or the appropriate related p-toluenesulphonate"

Line 6, change "5°C" to --at -5°C--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents